(12) United States Patent
Chen et al.

(10) Patent No.: US 11,374,823 B2
(45) Date of Patent: Jun. 28, 2022

(54) TELEMETRY-BASED METHOD AND SYSTEM FOR PREDICTIVE RESOURCE SCALING

(71) Applicant: MITEL NETWORKS CORPORATION, Kanata (CA)

(72) Inventors: Chunzhi Chen, Ottawa (CA); Paul Vandenbosch, Kanata (CA); Kenneth Armstrong, Woodlawn (CA); Logendra Naidoo, Ottawa (CA)

(73) Assignee: Mitel Networks Corp., Ottawa (CA)

( * ) Notice: Subject to any disclaimer, the term of this patent is extended or adjusted under 35 U.S.C. 154(b) by 0 days.

(21) Appl. No.: 16/738,122

(22) Filed: Jan. 9, 2020

(65) Prior Publication Data

US 2021/0218639 A1 Jul. 15, 2021

(51) Int. Cl.
| | |
|---|---|
| H04L 12/24 | (2006.01) |
| G06N 20/00 | (2019.01) |
| H04L 41/147 | (2022.01) |
| G06N 5/04 | (2006.01) |
| H04L 43/0876 | (2022.01) |
| H04L 65/10 | (2022.01) |
| H04L 65/65 | (2022.01) |

(52) U.S. Cl.
CPC ............. *H04L 41/147* (2013.01); *G06N 5/04* (2013.01); *G06N 20/00* (2019.01); *H04L 43/0876* (2013.01); *H04L 65/1006* (2013.01); *H04L 65/608* (2013.01)

(58) Field of Classification Search
CPC .... H04I 41/147; H04I 65/1006; H04I 65/608; H04L 43/0876; G06N 20/00; G06N 5/04

USPC ......................................................... 709/224
See application file for complete search history.

(56) References Cited

U.S. PATENT DOCUMENTS

| | | | |
|---|---|---|---|
| 2010/0083248 A1* | 4/2010 | Wood | G06F 9/45558 718/1 |
| 2015/0113120 A1* | 4/2015 | Jacobson | G06N 5/04 709/224 |
| 2015/0339572 A1* | 11/2015 | Achin | G06N 20/00 706/46 |

(Continued)

OTHER PUBLICATIONS

Masdari Mohammed et al: "A survey and classification of the workload forecasting methods . . . ", Cluster Computing, vol. 23, No. 4, Dec. 5, 2019, pp. 2399-2424.

(Continued)

*Primary Examiner* — Frantz B Jean

(57) ABSTRACT

A telemetry-based method and system is provided for predictive resource scaling by mining useful data based on communication behaviour such as human calling patterns, call quality, and integration. In an embodiment, the telemetry-based system comprises at least one predictor for generating a first scaling prediction value based on a first target process goal and a second scaling prediction value based on a second target process goal; an auto-scaler for auto-scaling resources based on the first scaling prediction value and second scaling prediction value; and a regulator for monitoring the first scaling prediction value and second scaling prediction value and auto-scaling of resources by the auto-scaler and applying an objective function indicating total normalized system performance to a reinforcement learning algorithm for improving prediction accuracy of the at least one predictor.

14 Claims, 3 Drawing Sheets

(56) References Cited

U.S. PATENT DOCUMENTS

2018/0284753 A1* 10/2018 Celia ................ G05B 19/41875
2019/0213099 A1* 7/2019 Schmidt ................ G06F 9/5083

OTHER PUBLICATIONS

Moreno-Vozmediano Rafael et al; "Efficient resource provisioning . . . ", Journal of Cloud Computing, vol. 8, No. 1, Apr. 16, 2019, p. 5.
Imdoukh Mahmoud et al: "Machine learning-based auto-scaling . . . ", Neural Computing and Applications, vol. 32, No. 13, Oct. 8, 2019, pp. 9745-9760.
Anonymous: "Feature scaling—Wikipedia", Dec. 26, 2019, https://en.wikipedia.org/w/index.php? title=Feature_scaling&oldid.

* cited by examiner

TELEMETRY-BASED METHOD AND SYSTEM FOR PREDICTIVE RESOURCE SCALING

FIELD OF INVENTION

The present disclosure generally relates to scaling of computer resources, and more particularly to a telemetry-based method and system for predictive resource scaling.

BACKGROUND

Running a complex cloud system with numerous users, endpoints, and services requires scalability to deal with bottlenecks due to traffic. In addition to simply keeping the cloud up and running, providers need to monitor for sudden changes in traffic patterns signifying a network intrusion, unpredictable peak-usage events, or other events that may go undiagnosed. When such changes in traffic are detected within the CPU or within the layer 3, the provider needs to automatically add or subtract compute or storage resources.

Scaling (or auto-scaling) systems are known for scaling computing, database, and storage-resources based on a set of predefined rules and metrics such as CPU, memory, and network utilization cycles being greater or less than certain thresholds.

Conventional scaling systems and methods, such as Amazon AWS auto scaling, are reactive in that scaling of resources is responsive to load measurements. Such systems depend on measurements of performance of physical hardware and computers, such as CPU utilization, memory utilization, network in or network out, etc. For example, an AWS EC2 instance (i.e. a virtual server in Amazon's Elastic Compute Cloud (EC2) that runs applications on the AWS infrastructure), is scaled up/down based on CPU usage or memory usage. With such prior art reactive resource scaling the error or problem that triggers scaling has already transpired (e.g. metering processes resulting from CPU usage).

Predictive scaling systems have been proposed, such as Amazon's Predictive Scaling for EC2, or as set forth in US20150113120A1 (Jacobson et al) which leverage data from cloud usage-instances (i.e. data that is mined from hardware elements in the cloud architecture). As with conventional auto scaling systems, such predictive scaling systems monitor the physical properties of the hardware to detect traffic problems but are not able to determine the root-cause of traffic and peak-usage performance issues because such predictive scaling systems are hardware performance focused.

In cloud and enterprise PBX systems, scalability is required to optimize computing-resource use, while maximizing network throughput and positively affecting response times to avoid the overloading of any single resource, such as a server servicing a mobile or desktop endpoint. In such cloud and enterprise PBX systems, where performance is dependent on conditions outside the local network, prior art resource scaling based on hardware performance is not able to correct problems before user quality of service (QoS) is negatively affected.

SUMMARY

As set forth below, a telemetry-based method and system is provided for predictive resource scaling by mining useful data based on communication behaviour such as human calling patterns, call quality, and integration (e.g. call failures, call waiting notifications, etc.), irrespective of hardware. Other embodiments include predictive scaling based on notifications such as chat, etc.

The telemetry-based method and system set forth herein uses a predictive algorithm (e.g. machine learning or A.I. based techniques) to resolve an impending traffic problem before it impacts performance for end users.

In contrast with Amazon predictive scaling for EC2, which uses collected hardware data, the telemetry-based method and system set forth herein utilizes data collected from the entire enterprise system, including the integration of internal micro services, which are monitored and represented by utilities such as Call Engines, SIP Proxies, or standard Media engines (for media replay) hosted in an EC2 instance. For example, collected data that is associated with SIP messaging, RTP packets, # of calls, call legs, length of calls, call rates, etc. can be extracted from common utilities such as SIP Proxies (i.e. SIP traffic), RTP engines (i.e. RTP packets), or Call Engines (i.e. Call Legs, etc.)

In one aspect a telemetry-based system for predictive resource scaling is provided, comprising at least one predictor for generating a first scaling prediction value based on a first target process goal and a second scaling prediction value based on a second target process goal, an auto-scaler for auto-scaling resources based on the first scaling prediction value and second scaling prediction value; and a regulator for monitoring the first scaling prediction value and second scaling prediction value and auto-scaling of resources by the auto-scaler and applying an objective function indicating total normalized system performance to a reinforcement learning algorithm for improving prediction accuracy of the at least one predictor.

BRIEF DESCRIPTION OF THE DRAWING FIGS

Subject matter of the present disclosure is particularly pointed out and distinctly claimed in the concluding portion of the specification. A more complete understanding of the present disclosure, however, may best be obtained by referring to the detailed description and claims when considered in connection with the drawing Figures.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

Figure 1:
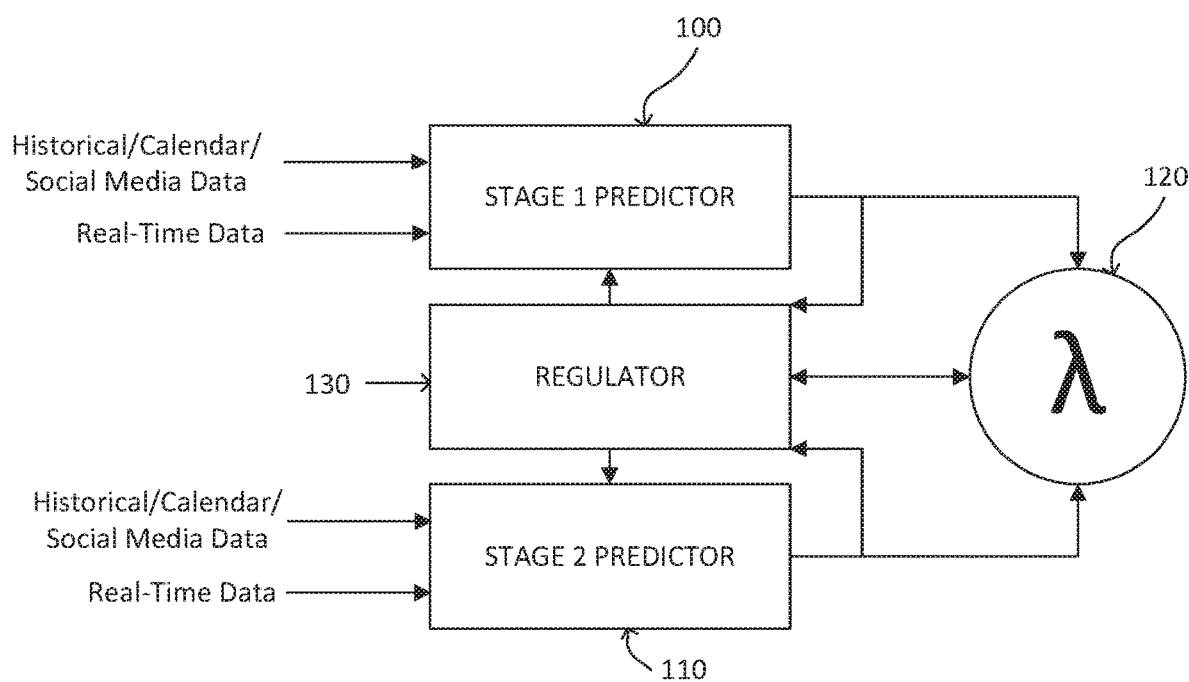
FIG. 1 illustrates a telemetry-based system for predictive resource scaling, according to an exemplary embodiment.

FIG. 1 depicts a telemetry-based system for predictive resource scaling, according to an aspect of this specification, comprising a first predictor 100 for generating a first scaling prediction value based on a first target process goal and a second predictor 110 for generating a second scaling prediction value based on a second target process goal. In one embodiment, the resources are virtual machine instances.

An auto-scaler 120 is provided for auto-scaling resources based on the first scaling prediction value from first predictor 100 and the second scaling prediction value from second predictor 110. A regulator 130 monitors the first scaling prediction value, second scaling prediction value and the auto-scaling of resources by the auto-scaler 120 and applies an objective function indicating total normalized system performance to a reinforcement learning algorithm for improving prediction accuracy of the first and second predictors 100 and 110, respectively.

In one embodiment, the first target process goal of first predictor 100 is desired CPU utilization and the second target process goal of second predictor 110 is desired network utilization based on application domain related data.

Telemetry-based system of FIG. 1 uses machine language (ML) reinforcement learning by regulator 130 with an objective function on overall application level performance, along with two-stage predictions (stage 1 predictor 100 and stage 2 predictor 110), and one process (auto-scaler 120), where the two stages of prediction target two goals together and the consequence of prediction are judged by the regulator 130 (i.e. via feedback of the judgement back to the predictors 100 and 110), as discussed in greater detail below.

In an embodiment, the machine language (ML) reinforcement learning by regulator 130 leverages Amazon machine learning (see https://docs.aws.amazon.com/machine-learning/latest/dg/tutorial.html)

Figure 2:
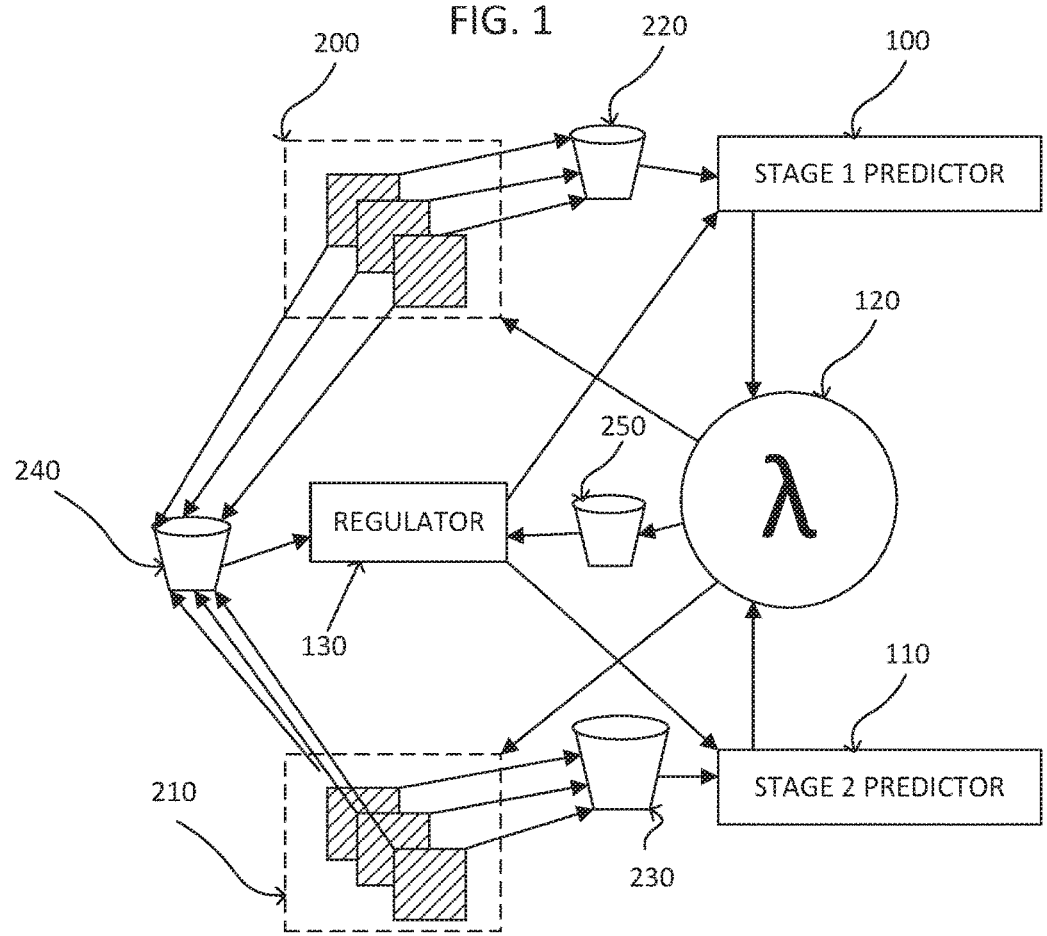
FIG. 2 shows details of the telemetry-based system, according to an embodiment.

FIG. 2 provides additional details of the telemetry-based system of FIG. 1. First and second predictive auto-scaling groups 200 and 210 include multiple EC2 instances that are configured to collect historical data and real-time data relating, respectively, to the first target process goal and the second target process goal of the first predictor 100 and second predictor 110. The data is collected by data gathering processes and saved to data buckets 220 and 230 for use by the first predictor 100 and second predictor 110, respectively. In addition, each data gathering process saves network and application specific data to a network and application data bucket 240. Similarly, auto-scaling events generated by auto-scaler 120 are saved in an auto scaling events data bucket 250.

Data from buckets 240 and 250 are used by regulator 130 for improving prediction accuracy of the first and second predictors 100 and 110, as discussed in greater detail below.

In an embodiment, predictive auto-scaling group 210 comprises the following processes running on EC2: an application server (e.g. Call Engine): a Session Initiation Protocol (SIP) server (e.g. SIP Proxy) and a Real-Time Transport Protocol (RTP) engine (e.g. Media Engine). The application server can provide historical data relating to call legs, such as call quality, speed of answer, abandon rate, etc. The Session Initiation Protocol (SIP) server (e.g. SIP Proxy) can provide historical data relating to SIP messages, such as request timeouts, gateway timeouts, busy, etc. The Real-Time Transport Protocol (RTP) engine (e.g. Media Engine) can provide historical data relating to call quality, error logs, etc. Stage 2 predictor 110 uses the collected data from bucket 230, along with optional supplemental data such as statutory holidays per region and/or historical cloud metrics (e.g. AWS CloudWatch metrics such as CPU usage, network I/O, etc.), to target on the second target process goal (i.e. application level performance) using a ML service to create a data model in the form of a collection of discernible patterns in the collected historical data. In another embodiment, the optional supplemental data may include regional major market index data.

In an embodiment, predictive auto-scaling group 200 comprises the same the processes running on EC2 as in auto-scaling group 210, namely an application server (e.g. call engine): a Session Initiation Protocol (SIP) server (e.g. SIP proxy) and a Real-Time Transport Protocol (RTP) engine (e.g. media engine).

In an embodiment, stage 2 predictor 110 is configured to generate the second scaling prediction value by: receiving historical data from bucket 230 relating to application level performance, formatting the historical data according to a data model of prediction and training on the formatted historical data using the machine learning algorithm. The stage 1 predictor 100 is configured to generate the first scaling prediction value by: receiving historical data from bucket 220, formatting the historical data according to the data model of prediction, training on the formatted real-time data using the machine learning algorithm, and in response sending a scaling signal to the auto-scaler for auto-scaling resources based on CPU utilization and application level performance.

Thus, both stage 1 predictor 100 and 2 stage predictor 110 are trained with historical data. Once trained, both predictor 1 and 2 uses real-time data for prediction.

As discussed above, regulator 130 is used to determine or judge if a scaling up or down decision made by the predictor 100 or 110 is correct or incorrect, by using reinforcement learning (RL), according to an objective function, for adjusting resources (instances) in the auto-scaling groups 200 and 210, as needed. According to an embodiment, the formula to express the objective function of RI, measures overall application performance in terms of total normalized performance for a selected number of calls at a given time using the resources in the auto-scaling groups, namely the auto-scaling groups for Call Engine, SIP Proxy, and Media Engine, and is expressed as:

$$TperfCloud = \left(\sum_{k=1}^{m} \frac{100}{r\_originate(k)}\right) / nfs + \left(\sum_{k=1}^{m} \frac{100}{r\_new\_dialog(k)}\right) / nkm + \left(\sum_{k=1}^{m} \frac{rtp\_audio\_in\_mos(k)}{5}\right) / nrtp, \text{ where:}$$

m is number of calls nfs is number of virtual machine instances in the application server predictive auto-scaling group nkm is number of virtual machine instances in the SIP server predictive auto-scaling group nrtp is number of virtual machine instances in the RTP engine predictive auto-scaling group r_originate(k) is response time to an originate command for a call k, as a measurement of a call K originated in the application server r_new_dialog(k) is response time to a new dialog for the call k, as a measurement of a call K created in the SIP server rtp_audio_in_mos(k) is a mos value of the call k, as a measurement of call K quality through the RTP engine, and wherein a value range [0 . . . 5]. 5 corresponds to best quality.

In reinforcement learning (RL), a reward is a value in the objective function representing system wide performance. Reinforcement learning uses reward and punishment as signals for positive and negative behavior, wherein a larger value of reward indicates better performance. As an example, using a constant, 1, as the reward factor for reinforcement learning, a call originating within 100 milliseconds results in 100/100×1=1 reward, whereas 500 calls originating within 100 milliseconds results in 500 rewards. For a single instance of Call Engine, the total resulting award is 500/1=500 (TperfCloud=100/100×1/1=500).

Continuing this example, after having trained on a large collection of data, the TperfCloud values can be used as standard values. For example, TperfCloud1=500+500+500=1500, when m=500, nfs=1, nkm=1, and nrtp=1, and TperfCloud2=1000/2+1000/2+1000/2=1500, when m=1000, nfs=2, nkm=2, and nrtp=2.

The possible resulting actions are to either increase or decrease the number of EC2 instances. Consider a scenario wherein 2000 calls originated within 500 milliseconds: TperforCloud=100/500×2000/1+2000/4+2000/4=1400, when m=2000 nfs=1 nkm=4 nrtp=4. Since 1400<1500, the total award is less than standard 1500, and the rewards 100/500×2000/1=400 indicates that the response time of origination is longer than standard (i.e. fewer rewards compared with 500). The action taken by regulator 130 in this situation may be to increase the number of nfs to 4 from 1 in order to improve the performance in originating time and, in turn, meet the goal of maximum total rewards.

In another scenario, wherein 2000 new call dialogs are created within 100 milliseconds, TperforCloud=2000/4+100/100×2000/5+2000/4=1400, when m=2000 nfs=4 nkm=5 nrtp=4. Since 1400<1500, the total award is less than standard 1500, and the rewards 100/100×2000/5=400 indicates the time in creating the new dialogs were good, but there are fewer rewards in this auto-scaling group. Therefore, the system used more resources in the auto-scaling group of SIP Proxy. The action taken by regulator 130 in this situation is to decrease the number of nkm from 5 to 4, which does not bring down the performance but instead results in more total rewards with lower cost. It is contemplated that several steps may be required using RL to decrease the nkm to 4 during training.

Returning to the system as depicted in FIG. 2, in an embodiment, first stage predictor 100 uses Amazon predictive scaling on a target, such as a certain value of CPU utilization, or a certain value of network utilization. If, for example, CPU utilization is chosen as the auto scaling target of the first stage predictor 100, the second stage predictor 110 uses a machine learning (ML) service to predict based on the second target, which in the present example is network utilization, by creating a data model based on network usage related data from bucket 230. Conversely, if the first stage target is network utilization, then the data model for the second stage would operate on CPU and memory related data.

As discussed above, Amazon predictive scaling does not have insight into application level knowledge, or domain knowledge. For example, in the telecommunication domain, call quality or effective connections etc. are important. In a given scenario the Amazon built-in predictive scaling may indicate that CPU utilization looks good, however, call quality might be low or connections may be dropped. Therefore, according to the telemetry-based system set forth herein, second stage predictor 110 collects application domain related data and uses the data model for refined.

Also, since human behavior may affect predictions of usage pattern using Amazon predictive scaling, according to an embodiment, a regional statutory holiday calendar representing human behavior and/or major regional market index to representing economic events and/or social media activity may be used as inputs to the predictive model of stage 2 predictor 110, such that the data model has insight on the application level in view of human behavior and economic events.

The data model for predictors 100 and 110 is created as follows:

First, a system process to predict is identified. In an embodiment, the process (or tool) runs in Amazon EC2. For example, as discussed above, the three different processes (or tools) running under Amazon EC2, may be a Call Engine, SIP Proxy, and Media Engine, respectively, although other EC2 processes (tools) may be chosen. In fact, any tool that is helpful in generating "secondary goal" data about how an application is being used, such as call-related metrics, may be used. It will be understood that over time, different types of data reflective of human consumption of features/functions in the telecommunication domain can be leveraged using the predictive functions disclosed herein.

Thus, for the stage-one predictor 100, Amazon predictive scaling can be used for three Amazon predictive auto-scaling groups running on EC2: Call Engine, SIP Proxy, and Media Engine respectively, with predictive scaling set to target on CPU utilization.

Second, for the stage-two machine learning predictor 110, data related to network usage on the auto scaling group is selected such as, for example, Network In, Network Out, etc. However, any type of data can be selected that indicates usage of the network. Thus, the stage two predictor 110 is used to extend the prediction of stage one to better fit the application domain. Another data type for indicating health of an application is connection error, while another data type may provide an indication of application level quality, for example call quality as represented by MOS value.

In an embodiment, the following data models may be used.

Data Model of Predictor for SIP Proxy

| Number of calls | Number of instances of SIP Proxy | Number of connections related to errors in SIP Proxy | Network In EC2 of this auto scaling group | Network Out of EC2 of this auto scaling group | TperfCloud, value of total normalized performance | Scaling up or down |
|---|---|---|---|---|---|---|

Data Model of Predictor for Call Engine

| Number of calls | Number of instances of Call Engine | Number of connections related to errors in Call Engine | Network In EC2 of this auto scaling group | Network Out of EC2 of this auto scaling group | TperfCloud, value of total normalized performance | Scaling up or down |
|---|---|---|---|---|---|---|

Data Model of Predictor for Media Engine

| Number of calls | Number of instances of Media Engine | Number of connections related to errors in Media Engine | Number of calls's MOS (quality fact) | Network In EC2 of this auto scaling group | Network Out of EC2 of this auto scaling group | TperfCloud, value of total normalized performance | Scaling up or down |
|---|---|---|---|---|---|---|---|
| | | | | | | | |

As discussed above, a regional statutory holiday calendar may be supplied to the three predictors (SIP Proxy, Call Engine and Media Engine) in order for the machine learning service to take specific holidays into consideration, because human behavior may change significantly over holiday periods.
Statutory Holiday Calendar Per Region Likewise, a regional major market index may be supplied to the three predictors, because a major market index can represent social or economic changes in a region.
Regional Major Market Index, e.g. Dow Jones Industrial Average or S&P/TSX Composite Index Additional non-traffic related data, such as social media activity, may also be supplied to the three predictors, for predicting when computing resources may be required for example when concert tickets go on sale, world cup soccer celebration, protest, etc.
Social Media Activity Data Thus, the stage-two prediction takes into consideration of social, economic, human behavior.

After having trained with historical data, the three predictors will be able to predict if it needs to increase or decrease number of EC2 instance in the three auto scaling groups correspondingly.

When a predictor forecasts a need for adjusting the number of EC2 instances, an adjustment will be performed to update the DesiredCapacity for the auto-scaling group it belongs to, via method updateAutoScalingGroup in AWS.AutoScaling.

The regulator 130 monitors bucket 250 to determine if the adjustment will achieve the desired result system wide, by feedback into the three predictors to improve accuracy of prediction.

If the TperfCloud value is decreasing, which means performance is deteriorating, and any of predictors indicate a decrease the number of EC2 instances, and alarm notification may be sent (e.g. an email with snapshot of the data model and value of TperfCloud, to a human operator for human intervention).

If the TperfCloud value is increasing, which means performance is improving but any of the predictors indicate an increase in the number of EC2 instances, an alarm notification may be sent, as discussed above.

Figure 3:
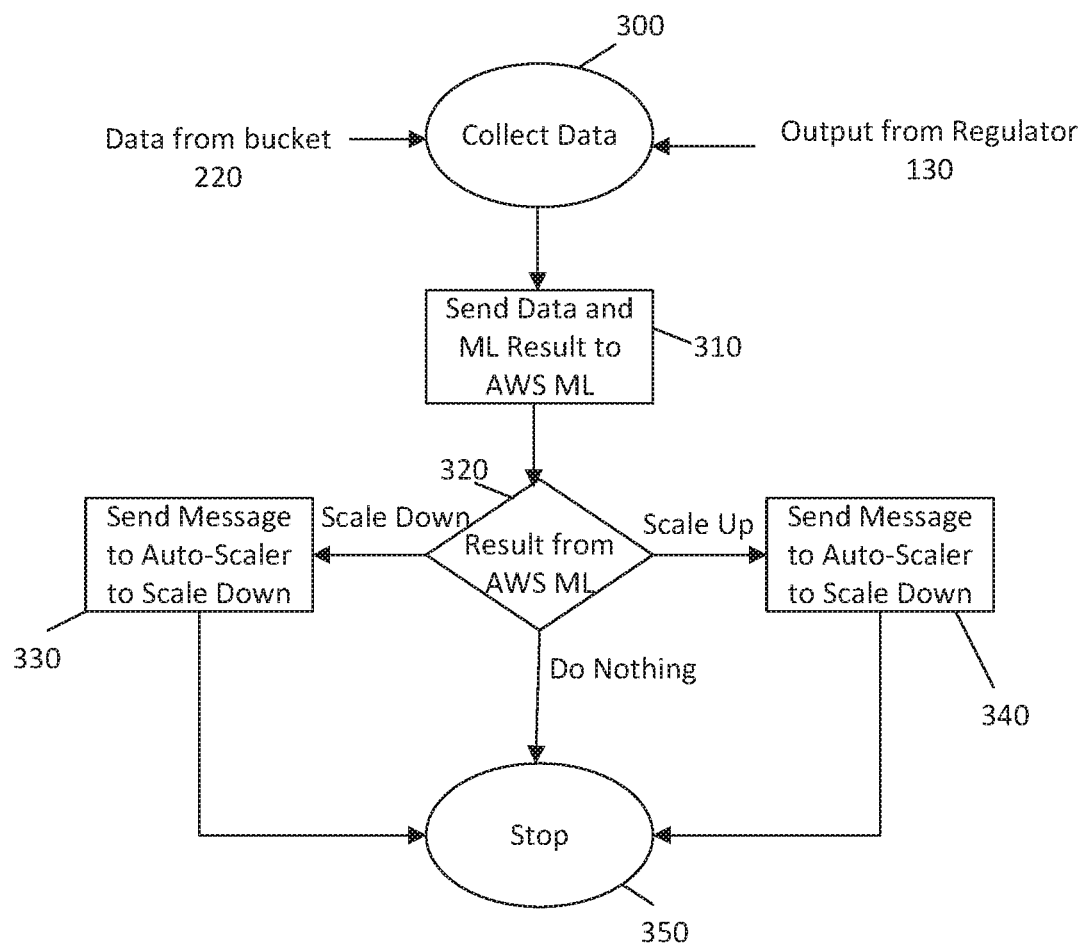
FIG. 3 is a flowchart showing a method of operating a predictor in the telemetry-based system of FIG. 1 or FIG. 2, according to an aspect.

FIG. 3 shows operation of the predictors 100, 110. Each EC2 processes (tool) is associated with its own predictor and auto-scaling group 200 and 210, etc., operating on its own collected data, according to the process of FIG. 3

At 300, historical data is collected from bucket 220 as well as the output ML result from regulator 130. The collected data is converted to the format of the data model set forth above and sent at 310 to Amazon Machine Learning service (Amazon ML) along with the ML result from regulator 130. The result from Amazon ML at 320 yields one of three possible predictions: scale up, scale down or do nothing. If the prediction is scale down, a message is sent at 330 for the auto-scaler 120 to scale down. If the prediction action is scale up, a message is sent at 340 for the auto-scaler 120 to scale up. After 330 or 340, or in the event the prediction is do nothing, the predictor process stops at 350.

Figure 4:
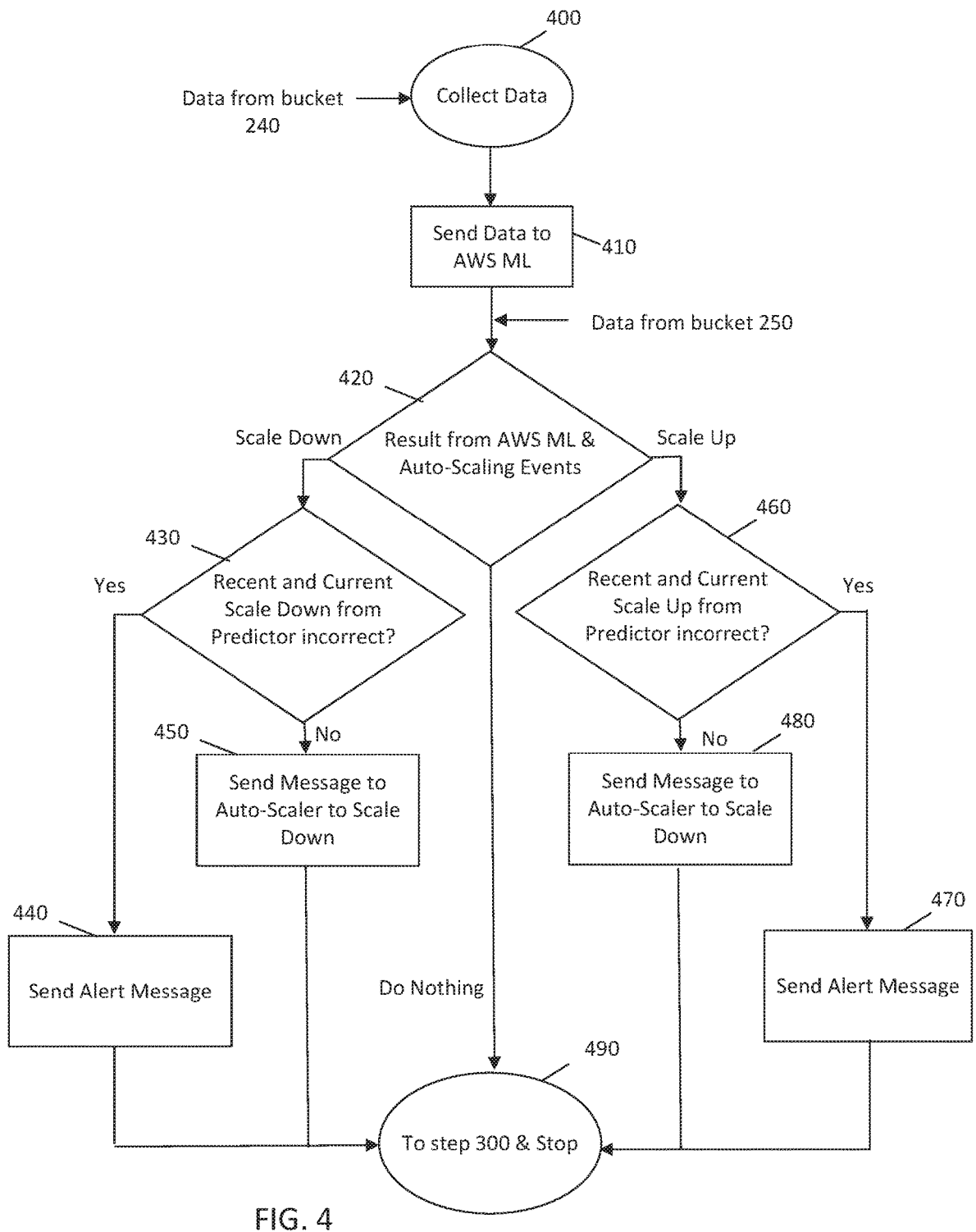
FIG. 4 is a flowchart showing a method of operating a regulator in the telemetry-based system of FIG. 1 or FIG. 2, according to an aspect.

FIG. 4 shows operation of regulator 130. At 400, network and application data is collected from bucket 240. The collected data is sent at 410 to Amazon Machine Learning service (Amazon ML). The result from Amazon ML and auto scaling events collected from bucket 250 are used at 420 to yields one of three possible actions: scale up, scale down or do nothing. If the action is scale down then, at 430 the regulator 130 determines if both the recent and current scale down message at 330 are incorrect. If yes, then at 440 an alert message is generated, as discussed above. If no, then a message is sent to auto-scaler 120 at 450 to scale down. If the action is scale up then, at 460 the regulator 130 determines if both the recent and current scale up message at 340 are incorrect. If yes, then at 470 an alert message is generated, as discussed above. If no, then a message is sent to auto-scaler 120 at 480 to scale up. After 440, 450, 470 or 480, or in the event the action is do nothing, the regulator passes the result to the predictor at step 300 and the process stops at 490.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. For example, although steps of methods are listed in a particular order, the steps need not be performed in the illustrated order and some steps may be performed simultaneously. These and other changes or modifications are intended to be included within the scope of the present invention, as expressed in the following claims.

We claim:

1. A telemetry-based system for predictive resource scaling, comprising:
   at least one predictor for generating a first scaling prediction value based on a first target process goal and a second scaling prediction value based on a second target process goal;
   an auto-scaler for auto-scaling resources based on the first scaling prediction value and second scaling prediction value;
   a regulator for monitoring the first scaling prediction value and second scaling prediction value and auto-scaling of resources by the auto-scaler and applying an objective function indicating total normalized system performance to a reinforcement learning algorithm for improving prediction accuracy of the at least one predictor, wherein the first target process goal is desired CPU utilization and the second target process goal is desired network utilization based on application domain related data;
   a plurality of predictive auto-scaling groups configured to collect historical data and real-time data relating to the first target process goal and the second target process goal; and wherein said resources are virtual machine instances;

wherein at least one of the predictive auto-scaling groups comprises one of either an application serve, Session Initiation Protocol (SIP) server or Real-Time Transport Protocol (RTP) engine; and wherein the at least one predictor is configured to generate the second scaling prediction value by:

receiving historical data relating to application level performance, formatting the historical data according to a data model of prediction, training on the formatted historical data using the reinforcement learning algorithm; and is further configured to generate the first scaling prediction value by:

receiving the real-time data, formatting the real-time data according to the data model of prediction, training on the formatted historical data using the reinforcement learning algorithm, and in response sending a scaling signal to the auto-scaler for auto-scaling resources based on CPU utilization and application level performance.

2. The telemetry-based system of claim 1, wherein the at least one predictor is further configured to receive statutory holiday calendar data and train on the statutory holiday calendar data in addition to formatted historical data.

3. The telemetry-based system of claim 1, wherein the at least one predictor is further configured to receive regional major market index data and train on the regional major market index data in addition to formatted historical data.

4. The telemetry-based system of claim 1, wherein the at least one predictor is further configured to receive social media data and train on the social media data in addition to formatted historical data.

5. The telemetry-based system of claim 1, wherein the objective function indicating total normalized system performance is expressed as:

$$TperfCloud = \left(\sum_{k=1}^{m} \frac{100}{r\_originate(k)}\right) / nfs + \left(\sum_{k=1}^{m} \frac{100}{r\_new\_dialog(k)}\right) / nkm + \left(\sum_{k=1}^{m} \frac{rtp\_audio\_in\_mos(k)}{5}\right) / nrtp,$$

where:

m is number of calls nfs is number of virtual machine instances in the application server predictive auto-scaling group nkm is number of virtual machine instances in the SIP server predictive auto-scaling group nrtp is number of virtual machine instances in the RTP engine predictive auto-scaling group r_originate(k) is response time to an originate command for a call k, as a measurement of a call K originated in the application server r_new_dialog(k) is response time to a new dialog for the call k, as a measurement of a call K created in the SIP server rtp_audio_in_mos(k) is a mos value of the call k, as a measurement of call K quality through the RTP engine, wherein a value range [0 . . . 5], 5 corresponds to best quality.

6. A telemetry-based system for predictive resource scaling, comprising at least one predictor for generating a first scaling prediction value based on a first target process goal and a second scaling prediction value based on a second target process goal;

an auto-scaler for auto-scaling resources based on the first scaling prediction value and second scaling prediction value; and a regulator for monitoring the first scaling prediction value and second scaling prediction value and auto-scaling of resources by the auto-scaler and applying art objective function indicating total normalized system performance to a reinforcement learning algorithm for improving prediction accuracy of the at least one predictor, wherein the first target process goal is desired CPU utilization and the second target process goal is desired network utilization based on application domain related data; and wherein said resources are virtual machine instances, and further comprising a plurality of predictive auto-scaling groups configured to monitor system hardware for autoscaling virtual machine instances based on traffic capabilities to achieve said desired CPU utilization.

7. The telemetry-based system of claim 6, wherein the virtual machine instances include at least one of an application server, a Session Initiation Protocol (SIP) serves and a Real-Time Transport Protocol (RTP) engine.

8. The telemetry-based system of claim 7, wherein the application server provides historical data relating to call legs.

9. The telemetry-based system of claim 8, wherein the historical call data includes at least one of call quality, speed of answer and abandon rate.

10. The telemetry-based system of claim 7, wherein the Session Initiation Protocol (SIP) server provides historical data relating to SIP messages.

11. The telemetry-based system of claim 10, wherein the historical data relating to SIP messages includes at least one of request timeouts, gateway timeouts and busy.

12. The telemetry-based system of claim 7, wherein the Real-Time Transport Protocol (RTP) engine provides historical data relating to at least one of call quality and error logs.

13. The telemetry-based system of claim 6, further comprising a plurality of predictive auto-scaling groups configured to collect historical data and real-time data relating to the first target process goal and the second target process goal.

14. The telemetry-based system of claim 13, wherein at least one of the predictive auto-scaling groups comprises one of either an application server, Session Initiation Protocol (SIP) server or Real-Time Transport Protocol (RTP) engine.

* * * * *